United States Patent
Lang et al.

(10) Patent No.: US 10,962,729 B2
(45) Date of Patent: Mar. 30, 2021

(54) BLOWN OPTICAL FIBER UNIT AND METHOD OF MANUFACTURING

(71) Applicant: Prysmian S.p.A., Milan (IT)

(72) Inventors: Ian Dewi Lang, Milan (IT); Mark Richard Mason, Milan (IT); Richard John Pennell, Milan (IT); John Andrew Bevis, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/488,570

(22) PCT Filed: Feb. 27, 2017

(86) PCT No.: PCT/EP2017/054438
§ 371 (c)(1),
(2) Date: Aug. 23, 2019

(87) PCT Pub. No.: WO2018/153489
PCT Pub. Date: Aug. 30, 2018

(65) Prior Publication Data
US 2020/0310065 A1    Oct. 1, 2020

(51) Int. Cl.
*G02B 6/44* (2006.01)
(52) U.S. Cl.
CPC ........... *G02B 6/443* (2013.01); *G02B 6/4438* (2013.01); *G02B 6/4464* (2013.01)
(58) Field of Classification Search
None
See application file for complete search history.

(56) References Cited

U.S. PATENT DOCUMENTS

| | | | | |
|---|---|---|---|---|
| 5,042,907 A | * | 8/1991 | Bell | C03C 25/106 385/123 |
| 5,459,175 A | * | 10/1995 | Woods | C08F 6/02 522/180 |
| 5,533,164 A | | 7/1996 | Preston et al. | |
| 5,555,335 A | * | 9/1996 | Barker | C03C 25/1065 385/100 |
| 6,014,488 A | * | 1/2000 | Shustack | C03C 25/106 385/128 |
| 2005/0207716 A1 | | 9/2005 | Konstadinidis et al. | |
| 2006/0147163 A1 | * | 7/2006 | Mayhew | G02B 6/4464 385/100 |
| 2009/0087154 A1 | | 4/2009 | Bradley et al. | |

(Continued)

FOREIGN PATENT DOCUMENTS

EP    0296836 A1    12/1988
EP    0521710 A1    1/1993
(Continued)

OTHER PUBLICATIONS

DSM, "Bufferlite, Optical Fiber Coatings,," Product Data, Bufferlite DU-1002, Mar. 1, 2007, 3 pages.

*Primary Examiner* — Michael Stahl
(74) *Attorney, Agent, or Firm* — Slater Matsil, LLP

(57) ABSTRACT

In one embodiment, an air-blown optical fiber unit includes one or more optical fibers, an inner layer substantially completely embedding the one or more optical fibers, and an outer layer radially external to the inner layer. The inner layer has a tensile strength of from 0.1 MPa to 1 MPa, and an elongation at break of from 10% to 80%.

22 Claims, 2 Drawing Sheets

(56) References Cited

U.S. PATENT DOCUMENTS

2015/0277031 A1* 10/2015 Bookbinder .......... C03C 25/285
　　　　　　　　　　　　　　　　　　　　　　　　385/115
2016/0004025 A1*　1/2016 Jost ...................... G02B 6/4432
　　　　　　　　　　　　　　　　　　　　　　　　385/105
2016/0274324 A1*　9/2016 Sutehall ............... G02B 6/4438

FOREIGN PATENT DOCUMENTS

EP　　　　1600801 A2　11/2005
WO　　2014194949 A1　12/2014

* cited by examiner

BLOWN OPTICAL FIBER UNIT AND METHOD OF MANUFACTURING

CROSS-REFERENCE TO RELATED APPLICATIONS

This application is a national stage of International Application No. PCT/EP2017/054438, filed on Feb. 27, 2017, which application is hereby incorporated herein by reference.

TECHNICAL FIELD

This application relates to optical fiber, and in particular to blown optical fiber unit and method of manufacturing.

BACKGROUND

Fiber optic cables have been commonly deployed by installing them in ducts by blowing or pulling, burying them in the ground, or suspending them between above-ground poles.

Optical microcabling technology has been introduced for the deployment of fiber optic cables to increase use of the conduit space and to enhance profitability of the current (and/or future) telecommunications infrastructure. This technology involves the use of standard inner ducts in which microducts are jetted, followed by the jetting of microduct cables or microcables into the microducts when required. Although originally intended for business access networks (FTTB) and fiber-to-the-home (FTTH), this technology has been used successfully in long-haul applications as well.

Microducts are empty tubes that can be blown or pushed into empty or partially filled standard ducts. Optical fiber units, specifically designed for this kind of application, are then installed as needed inside the microduct tubes by blown installation techniques.

In some known blown optical fiber units, a number of coated optical fibers (for example, four, in bundles or ribbon, but also a single optical fiber) are contained within an inner layer enclosed in an outer layer having greater hardness. In the outer layer particulate material (typically hollow or solid glass beads) can be embedded.

EP 0 521 710 A1 discloses an optical fiber package suitable for blown installation and a method of making an optical fiber package for blown installation in a continuous process. The fibers are held in a soft buffer layer. About this buffer layer there is a further resin layer which is a tough layer. For 4-fiber package units, a buffer layer is exemplified made of a material having a tensile strength of 1.3 MPa, a Shore D hardness of 49 and a 115% elongation.

US 2009/0087154 discloses cable designs for indoor installations wherein the cable comprises a dual-layer optical fiber buffer encasement of acrylate resin. The buffer encasement has an acrylate compliant inner layer that protects the fiber and minimizes stress transfer to the fiber; and a hard, tough acrylate outer layer that provides crush resistance. The dual-layer optical fiber buffer encasement is wrapped with reinforcing yarn and encased in an outer protective jacket.

EP 0 296 836 A1 discloses an optical fiber cable comprising an inner sheath containing at least one optical fiber member, and an outer sheath containing the inner sheath. The inner sheath is of a material which is soft and has a low modulus of elasticity. The outer sheath of a material has bulk and surface properties such that the cable can be propelled along a duct by a flow of air travelling along the duct. An intermediate sheath may be provided between the inner and outer sheaths.

EP 1 600 801 A2 discloses a fiber optic cable including a core of coated optical fibers embedded in an inner layer of acrylate material, having sufficient tensile strength when cured to lock at least the outermost fibers in place and still allow the fibers to be easily broken out of the assembly for termination and splicing purposes. Suitable materials for the inner layer have tensile strength greater than 10 MPa.

U.S. Pat. No. 5,533,164 discloses an optical fiber assembly for blown installation, comprising a fiber unit having at least one optical fiber. The unit has a coating comprising an external layer of a material containing hollow glass beads at least some of which project from the outer surface of the external layer. The coating also has an inner, buffer layer of a material having a lower modulus of elasticity than that of the material of the external layer and an intermediate layer of material disposed between the external and inner layers.

SUMMARY

A user might have the need to access the optical fiber(s) of a blown optical fiber unit for instance for termination purposes. When a user accesses the optical fiber(s) within a blown optical fiber unit, damages to the optical fiber(s) should be avoided.

In order to prevent damages to the optical fiber(s) in the optical fiber unit, measures should be taken for safely removing the inner layer from around the optical fibers. As "safely removing" it is here meant that the material of the inner layer should be removed without leaving tenacious residue on the optical fibers and/or without detaching portions of the optical fibers coating and/or causing any damage to the optical fibers in general.

In the present description and claims, the term "fiber breakout failure" or "breakout failure" will refer to any optical fiber damage occurring while removing the optical fiber unit inner layer from the optical fiber(s) and caused by the bond between optical fibers and inner layer.

According to the Applicant, the primary reason for breakout failure lies in the materials used in the unit. Typically, an optical fiber comprises a glass core surrounded by one or more polymer coating layer. The polymer used for the fiber coating layer/s and that of the inner layer of the optical fiber unit are both acrylate based. When the polymers of optical fiber coatings are not adequately cured, the polymer of the inner layer of the optical fiber unit could cross link and bond to the fiber. In addition, some of the proprietary available polymers include components which promote bonding between optical fibers coating and optical fiber unit inner layer. Use of such components may be beneficial in optical fiber unit manufacture, but their presence is likely to be detrimental for "breakout failure" of the optical fiber.

The Applicant has noted that the materials of the inner layer of known optical fiber units, such as those described in the above-mentioned documents, have mechanical features possibly resulting in breakout failure when the optical fibers are to be accessed.

The selection of a material for the inner layer of an optical fiber unit is generally made on the basis of mechanical properties suitable for cooperating with the harder outer layer in providing the optical fibers of the unit with due protection to pressure and/or bending during deployment.

The prior art—see, for example, the already mentioned EP 1 600 801 A2—recognized the importance of an easy and soft removal of the optical fiber unit layers from the optical fiber. A disadvantage of soft materials, however, is that they are more easily damaged during installation.

The Applicant has tackled the problem of balancing the need of having a material suitable to be peeled-off from the optical fibers of the unit with no or limited fiber breakout failure, and, at the same time, capable of facing the stress of the installation without substantial damage to the optical fibers contained therein.

The Applicant considered as inner layer of an optical fiber unit a polymer material having relatively low tensile strength and elongation at break such as to make it a sacrificial layer when accessing the optical fibers.

The Applicant surprisingly found that an optical fiber unit with an inner layer having such relatively low mechanical properties is suitable for being safely removed from the optical fibers, while still providing the optical fiber unit with sufficient stress resistance to be efficiently deployed by blowing without impairing the attenuation of the optical fibers.

According to one aspect, the present invention provides an optical fiber unit for air-blown installations comprising: a number of optical fibers, an inner layer substantially completely embedding said optical fibers, and an outer layer radially external to the inner layer, wherein said inner layer has a tensile strength of from 0.1 MPa to 1 MPa, and an elongation at break of from 10% to 80%.

According to another aspect, the present invention relates to a method of manufacturing an optical fiber unit for air-blown installations, the method comprising: providing a number of optical fibers, applying an inner layer on said number of optical fibers, preferably at a temperature of from 15° C. to 30° C., applying an outer layer; curing the inner layer to provide a tensile strength of from 0.1 MPa to 1 MPa and an elongation at break of from 10% to 80%; and curing the outer layer.

In a preferred embodiment, the method of manufacturing according to the invention comprises curing the inner layer before applying the outer layer (wet-on-dry application). Advantageously, the inner layer is cured at least 90% before applying the outer layer.

Alternatively, the inner layer is uncured at the application of the outer layer (wet-on-wet application). After the application of the outer layer, the inner and outer layers are simultaneously cured.

In a preferred embodiment, the curing of the inner and/or the outer layer is carried out by UV or IR irradiation.

The optical fiber unit of the invention may comprise a number of optical fibers of from 1 to 24, preferably from 4 to 12.

The optical fiber of the unit of the invention comprises glass core surrounded by one, preferably two polymer coating layers. In particular a first coating layer surrounds and is in direct contact with the glass core; a second coating layer surrounds and is in direct contact with first coating layer. The fibers may have a coloured secondary coating layer or a third layer can surround and directly contact the second coating layer, this third layer being coloured or having indicia for identification purposes.

In a preferred embodiment, the optical fiber unit of the invention comprises an inner layer having a tensile strength of from 0.5 MPa to 0.9 MPa.

In a preferred embodiment, the optical fiber unit of the invention comprises an inner layer having an elongation at break of from 20% to 35%, more preferably of from 30% to 35%.

In a preferred embodiment, the optical fiber unit of the invention comprises an inner layer having a Shore A hardness of from 10 to 40, more preferably of from 20 to 38, even more preferably of from 25 to 35.

In a preferred embodiment, the optical fiber unit of the invention comprises an inner layer having a 2.5% secant modulus of from 1 MPa to 10 MPa, preferably of from 3 MPa to 6 MPa.

In the optical fiber unit of the invention, the outer layer is provided in a radial external position with respect to the inner layer and in direct contact thereto.

In the optical fiber unit of the invention, the outer layer has a hardness greater than that of the inner layer. In a preferred embodiment, the outer layer has a Shore D hardness of from 30 to 80, more preferably of from 40 to 70.

In a preferred embodiment, the optical fiber unit of the invention comprises an outer layer having a tensile strength of from 10 MPa to 60 MPa, more preferably from 30 to 40 MPa.

In a preferred embodiment, the optical fiber unit of the invention comprises an outer layer having a 2.5% secant modulus of from 500 MPa to 1000 MPa, preferably of from 600 MPa to 750 MPa.

The optical fiber unit of the invention may further comprise an ink layer in radially outer position with respect to the outer layer and in direct contact thereto.

In the present description and claims as "ink layer" is meant a layer of relatively small thickness, coloured and/or bearing indicia.

The ink layer optionally present may have a thickness of from 5 µm to 50 µm, preferably of from 10 µm to 15 µm.

In a preferred embodiment, the ink layer optionally present has a hardness greater than that of the underlying outer layer, preferably a Shore D hardness of from 40 to 90, more preferably of from 50 to 80.

The ink layer optionally present may have a tensile strength of from 10 MPa to 60 MPa, more preferably from 25 to 35 MPa.

In a preferred embodiment, the inner and/or outer layer of the optical fiber unit of the invention is made of a material based on acrylate material. More preferably, the inner and outer layer of the optical fiber unit of the invention is made of a material based on acrylate material.

The optical fiber unit of the invention may further comprise beads partially embedded into the outer layer, these beads being hollow or solid, preferably solid. When the optical fiber unit of the invention comprises these beads, it does not comprise the ink layer in radially outer position with respect to the outer layer.

The beads optionally present in the optical fiber unit of the invention are applied to the outer layer when this latter is still uncured. For example, beads can be applied as described in WO2014/194949.

The optical fiber unit of the invention may have an advantageously reduced diameter with respect to known optical fiber unit containing the same number of optical fibers having substantially the same diameter. For example, when the optical fiber unit comprises one optical fiber having a diameter of 250 µm, its outer diameter can be of 680 µm at most; when the optical fiber unit comprises four optical fibers having a diameter of 250 µm, its outer diameter can be of 890 µm at most; when the optical fiber unit comprises twelve optical fibers having a diameter of 250 µm, its outer diameter can be of 1290 µm at most; when the optical fiber unit comprises twenty-four optical fibers having a diameter of 250 µm, its outer diameter can be of 1750 µm at most. These outer diameter values are referred to optical fiber units with no ink layer or beads embedded in the outer layer.

The outer layer or, if present, the ink layer is the outermost portion of the optical fiber unit of the invention.

In the present description and claims: the term "radial" is used to indicate a direction perpendicular to a reference longitudinal axis of the cable; the expressions "radially inner" and "radially outer" are used to indicate a position along a radial direction with respect to the above-mentioned longitudinal axis; a size along the radial direction is termed "thickness"; and the verb "to embed" means to enclose closely in or as if in a matrix.

The Shore hardness has been evaluated according to ISO 868_2003-03-01. The tensile strength, the elongation at break and the secant modulus have been evaluated according to ISO 527-1-2012.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

The present invention will be further described in the following detailed description, given by way of example and not of limitation, with reference to the following figures, wherein.

DETAILED DESCRIPTION OF ILLUSTRATIVE EMBODIMENTS

The present invention relates to optical fiber units for air-blown installations. In particular, the present invention relates to a blown optical fiber unit providing high performance in terms of accessibility of the optical fiber(s). The present invention also relates to a method of manufacturing such an optical fiber unit.

Figure 1:
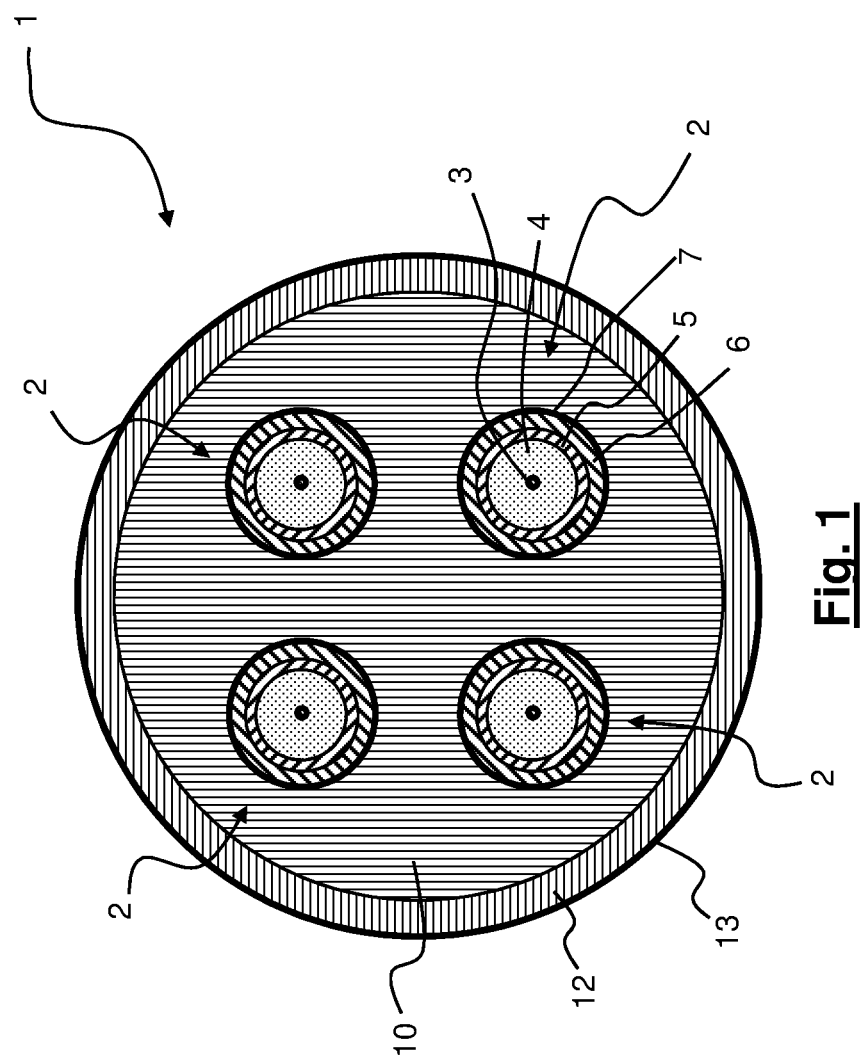
FIG. 1 shows a cross-section of a blown optical fiber unit according to a first example of the present invention.

FIG. 1 shows a cross-section of a blown optical fiber unit 1 according to a first example of the present invention. The unit 1 comprises four optical fibers 2, an inner layer 10 and an outer layer 12.

It should be noticed that the number of optical fibers 2 is not relevant for the present invention and the number of optical fibers could be any number. Also an optical core with a single optical fiber is deemed within the scope of the present invention.

Each optical fiber 2 comprises a glass core comprising an optical waveguide 3, for example a single mode optical waveguide, and a cladding 4 surrounding the waveguide 3. A first polymeric coating 5 surrounds the cladding 4 and a second polymeric coating 6 surrounds the first polymeric coating 5. According to embodiments, each optical fiber 2 may further comprise a third polymeric coating 7, typically an ink layer, surrounding the second polymeric coating 6.

Preferably, the optical fibers 2 of the optical core are arranged in a bundle.

Each optical fiber 2 can have a fiber outer diameter of from 150 μm to 300 μm, preferably from 200 μm to 245 μm, when the third polymeric coating 7 is absent.

The third polymeric coating 7 could have a thickness of 5 μm.

The blown optical fiber unit 1 according to the present invention further comprises an inner layer 10 embedding the optical fibers 2.

Preferably, the inner layer 10 of the embodiment of FIG. 1 (relating to an optical fiber unit 1 comprising four optical fibers 2 having an outer diameter of 255 μm) has a diameter of 780 μm.

The blown optical fiber unit 1 according to the present invention further comprises an outer layer 12 surrounding and in direct contact with the inner layer 10. The outer layer 12 of the embodiment of FIG. 1 (relating to an optical fiber unit 1 wherein the inner layer 10 has a diameter of 780 μm) has an outer diameter 12 of 920 μm.

The blown optical fiber unit 1 according to the present invention further preferably comprises an ink layer 13 surrounding the outer layer 12.

The ink layer 13 has a thickness of 10 μm.

The Applicant has tested several materials for the inner buffer, with the object to reduce fiber breakout failure. A suitable material is Herkula® Series 830/801, produced by Herkula Farben GmbH, Willich, Germany.

Figure 2:
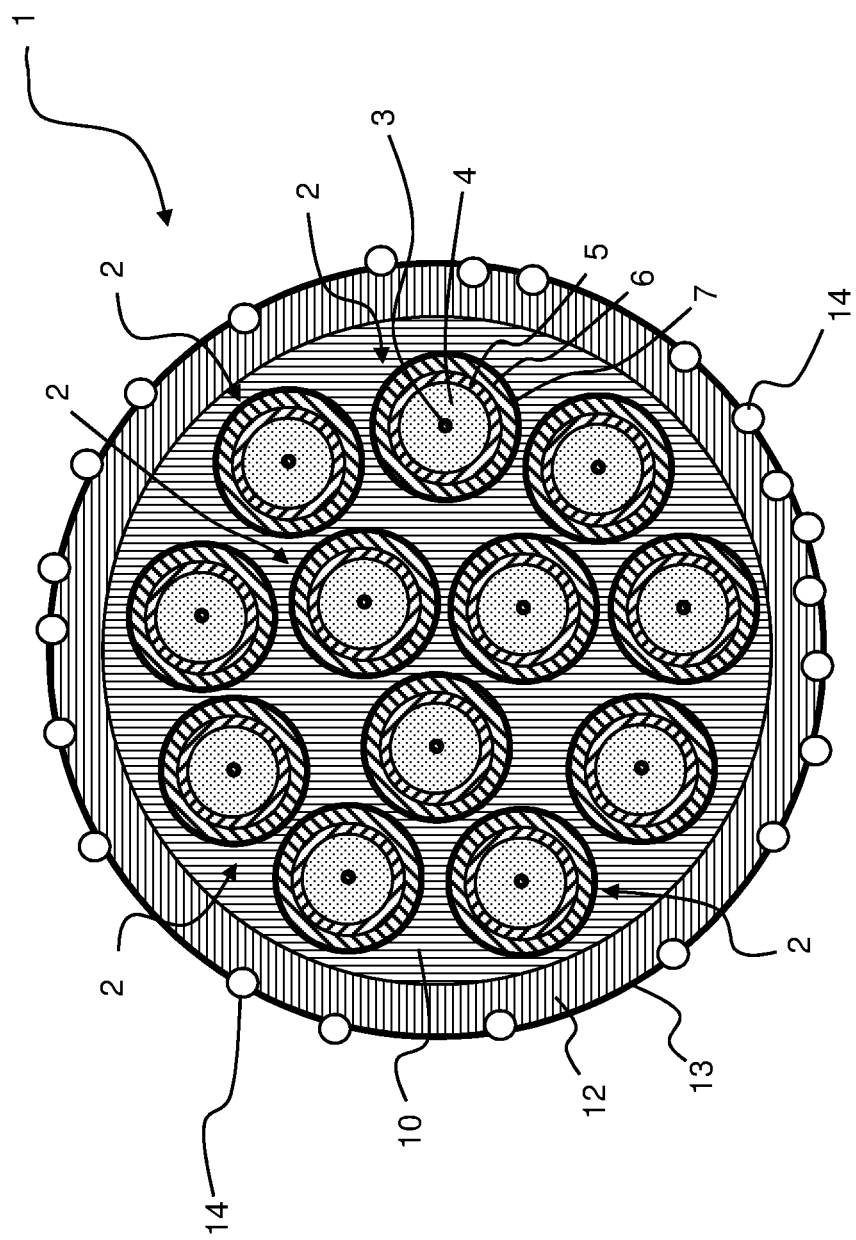
FIG. 2 shows a cross-section of a blown optical fiber unit according to a second example of the present invention.

FIG. 2 is a cross-section of a second example of the present invention. In FIG. 2, the same reference numbers of FIG. 1 apply to the same cable parts. The blown optical fiber unit 1 of FIG. 2 comprises twelve optical fibers 2. The optical fiber unit 1 of FIG. 2 has beads 14 partially embedded in the outer layer 12. Beads 14 can be of glass or the like.

Test 1

The fiber breakout performance in an optical fiber unit according to the invention was tested as follows.

A first blown optical fiber unit according to the example of FIG. 1 was manufactured. The novel unit was made using Herkula® Series 830/801 for the inner layer, so that this layer had a Shore A hardness of 28, a tensile strength of 0.6 MPa and an elongation at break of 30%.

The optical core comprised four optical fibers manufactured by different manufacturers. The four fibers were embedded in the inner layer made of Herkula® Series 830/801 at a temperature of 27° C. An outer buffer made of DSM Cablelite® 3287-9-75 was applied over the inner layer.

A second blown optical fiber unit according to the example of FIG. 1 was manufactured. This second unit is a comparative one. The optical core comprised the same four optical fibers of the first unit but embedded in an inner layer made of DSM 3287-9-39A having a tensile strength of 1.3 MPa and an elongation at break of 135% and DSM Cablelite® 3287-9-75 for the outer layer. The application of the inner layer was carried out at a temperature of 40° C.

Different temperatures for the application of the inner layers of the first and of the second optical fiber unit were necessary for having the two materials at substantially the same viscosity.

The fiber breakout performance was evaluated according to the British Telecom standard CW1574, Issue 13 (1993), section 3.4.

Table 1 shows the results of Test 1.

TABLE 1

| Fiber | Second unit Breakout | First unit Breakout |
|---|---|---|
| Grey | F | P |
| Violet | P | P |
| White | F | P |
| Orange | P | P |

P = positive
F = failed

The first unit according to the invention reached a Positive grade, while only two fibers of the comparative second unit were considered positive in the test. Without being necessarily limited to any one particular explanatory theory, the Applicant considers that this extremely positive result has been obtained owing to the mechanical features of the inner layer according to the invention, especially in terms of tensile strength and elongation at break.

Test 2

The attenuation performance of the first blown optical fiber unit as from Test 1 was tested according to ITU-T G.652 (06/2005).

Attenuation results for first unit are indicated in Table 2 below.

TABLE 2

| First Unit | | | |
|---|---|---|---|
| Fiber | 1310 nm (dB/km) | 1550 nm (dB/km) | 1625 nm (dB/km) |
| Grey | 0.354 | 0.229 | 0.330 |
| Violet | 0.325 | 0.214 | 0.232 |
| White | 0.331 | 0.214 | 0.228 |
| Orange | 0.327 | 0.208 | 0.215 |

The attenuation of the optical fibers in the unit of the invention resulted in conformity with the values requested by of ITU-T G.652 (06/2005) standard, Table 4 (G.652.D). This test showed that, though the optical fibers of the unit of the invention were embedded in a "soft" inner layer, such inner layer was anyway suitable for protecting the fibers against attenuation. The material of the inner layer according to the invention provided improved fiber break-out with no detrimental effect to the optical performance.

Test 3

The blowing performance of a length of the first optical fiber unit of the invention as from Test 1 was tested according to the British Telecom standard CW1574 Issue 13 (1993), section 7.3.1.

The blow test was carried out under the following conditions/parameters, which is summarized in the tables below.

| Blown Parameters | |
|---|---|
| Tube | Emtelle FC6187624 |
| Bore [mm] | 3.5 nominal |
| Tube Outside Diameter [mm] | 5 |
| No. of Times Used | 14 |

| Route Details | |
|---|---|
| Length [m] | 500 (Internal ducted) |
| Route Details | Delivery drum |
| Airflow @ [l/min] | 11 bar |

| Test Details | |
|---|---|
| Compressor model | 2 x Factair |
| Comp. pressure/capacity | 11.0 bar/120 l/min |
| Blowing equipment details | Plumettaz |
| Pressure at input [bar] | 9.80 |
| Dewpoint [° C.] | −24.8 |

| Test Details | |
|---|---|
| Clutch Setting | 4.00 |
| Fiber Guide | Brass |
| Ambient temperature [° C.] | 18 |
| Weather conditions | overcast, damp |

| Results | |
|---|---|
| Distance Blown [m] | 500 |
| Time [min] | 20.15 |
| Speed [m/min] | 24.8 |

After blowing, the first optical fiber unit complied with the above mentioned standard in terms of optical fiber attenuation showing that the inner layer can provide the optical fibers with suitable protection during deployment.

The invention claimed is:

1. An air-blown optical fiber unit comprising:
   one or more optical fibers;
   an inner layer substantially completely embedding the one or more optical fibers; and
   an outer layer radially external to the inner layer,
   wherein the inner layer has a tensile strength of from 0.1 MPa to 1 MPa, and an elongation at break of from 20% to 35%.

2. The optical fiber unit of claim 1, wherein the optical fiber unit comprises one to twenty four optical fibers.

3. The optical fiber unit of claim 1, wherein the inner layer has a tensile strength of from 0.5 MPa to 0.9 MPa.

4. The optical fiber unit of claim 1, wherein the inner layer has a Shore A hardness of from 10 to 40.

5. The optical fiber unit of claim 1, wherein the inner layer has a 2.5% secant modulus of from 1 MPa to 10 MPa.

6. The optical fiber unit of claim 1, wherein the outer layer has a Shore D hardness of from 30 to 80.

7. The optical fiber unit of claim 1, wherein the outer layer has tensile strength of from 10 MPa to 60 MPa.

8. The optical fiber unit of claim 1, wherein the outer layer has a 2.5% secant modulus of from 500 MPa to 1000 MPa.

9. The optical fiber unit of claim 1, further comprising an ink layer in radially outer position with respect to the outer layer and in direct contact thereto.

10. The optical fiber unit of claim 9, wherein the ink layer has a Shore D hardness of from 40 to 90.

11. The optical fiber unit of claim 1, wherein the optical fiber unit has an outer diameter of at most 890 μm and comprises four optical fibers having a diameter of 250 μm.

12. The optical fiber unit of claim 1, wherein each of the one or more optical fibers comprises:
   an optical waveguide;
   a cladding surrounding the optical waveguide;
   a first polymeric coating surrounding the cladding;
   a second polymeric coating surrounding the first polymeric coating; and
   a third polymeric coating surrounding the second polymeric coating.

13. An air-blown optical fiber unit comprising:
   an optical fiber comprising an optical waveguide;
   an inner layer surrounding the optical fiber;
   an outer layer radially external to the inner layer; and
   either an ink layer disposed around the outer layer; or
   a plurality of beads at least partially embedded into the outer layer, wherein the inner layer has a tensile strength of from 0.1 MPa to 1 MPa, and an elongation at break of from 20% to 30%.

14. The optical fiber unit of claim 13, wherein the optical fiber comprises:
   a cladding surrounding the optical waveguide;
   a first polymeric coating surrounding the cladding;
   a second polymeric coating surrounding the first polymeric coating; and
   a third polymeric coating surrounding the second polymeric coating.

15. The optical fiber unit of claim 13, wherein the optical fiber unit further comprises a plurality of optical fibers, wherein a total number of optical fibers in the optical fiber unit is between two and twenty four.

16. A method of manufacturing an air-blown optical fiber unit, the method comprising:
   providing one or more optical fibers;
   applying an inner layer on the one or more optical fibers;
   applying an outer layer;
   curing the inner layer to provide a tensile strength of from 0.1 MPa to 1 MPa and an elongation at break of from 20% to 35%; and
   curing the outer layer.

17. The method of claim 16, wherein the applying an inner layer on the one or more optical fibers is carried out at a temperature of from 15° C. to 30° C.

18. The method of claim 16, wherein the outer layer is applied on an uncured inner layer and then the inner and outer layers are simultaneously cured.

19. The method of claim 16, further comprising providing an ink layer in radially outer position with respect to the outer layer and in direct contact thereto, wherein the ink layer has a Shore D hardness of from 40 to 90.

20. The optical fiber unit of claim 1, comprising a plurality of optical fibers, wherein the inner layer comprises a matrix that completely embeds the plurality of optical fibers.

21. The optical fiber unit of claim 13, wherein the optical fiber unit further comprises a plurality of optical fibers, wherein the inner layer comprises a matrix that completely embeds the plurality of optical fibers.

22. The method of claim 16, wherein providing the one or more optical fibers comprises providing a plurality of optical fibers, and wherein applying an inner layer comprises applying a matrix that completely embeds the plurality of optical fibers.

* * * * *

UNITED STATES PATENT AND TRADEMARK OFFICE
CERTIFICATE OF CORRECTION

PATENT NO. : 10,962,729 B2
APPLICATION NO. : 16/488570
DATED : March 30, 2021
INVENTOR(S) : Ian Dewi Lang et al.

Page 1 of 1

It is certified that error appears in the above-identified patent and that said Letters Patent is hereby corrected as shown below:

In the Claims

Column 9, Line 2, Claim 13, delete "30%" and insert --35%--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*